July 4, 1961   H. E. CRAWFORD   2,990,630
TREE MOVING MACHINE
Filed Feb. 18, 1959   7 Sheets-Sheet 6
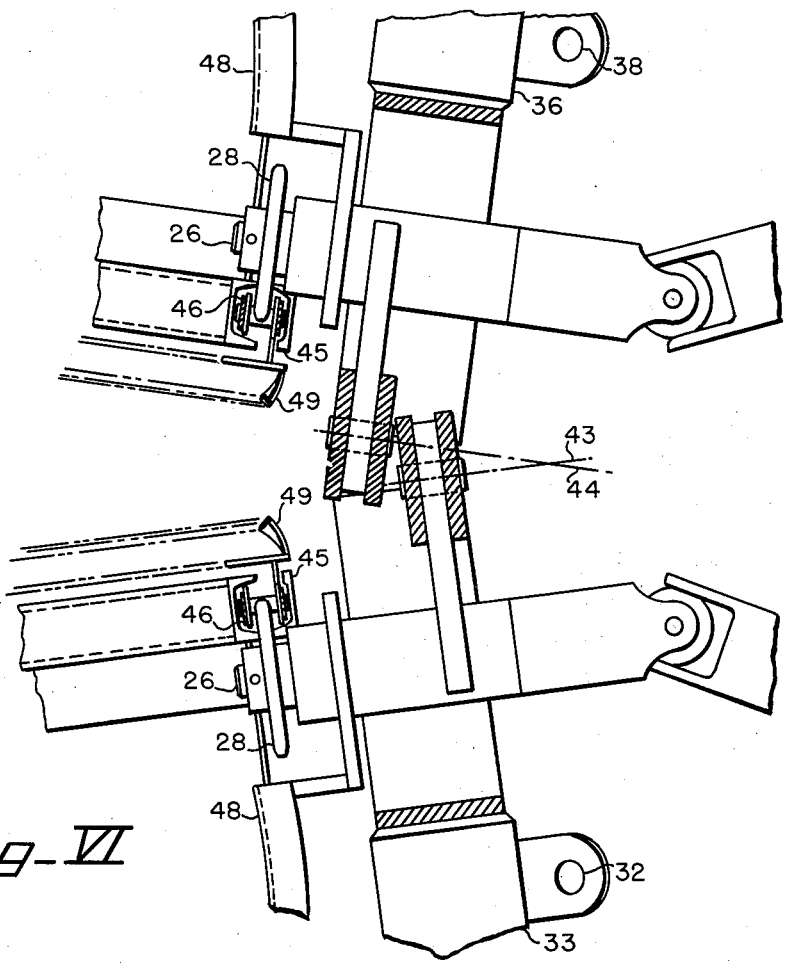
Fig. VI
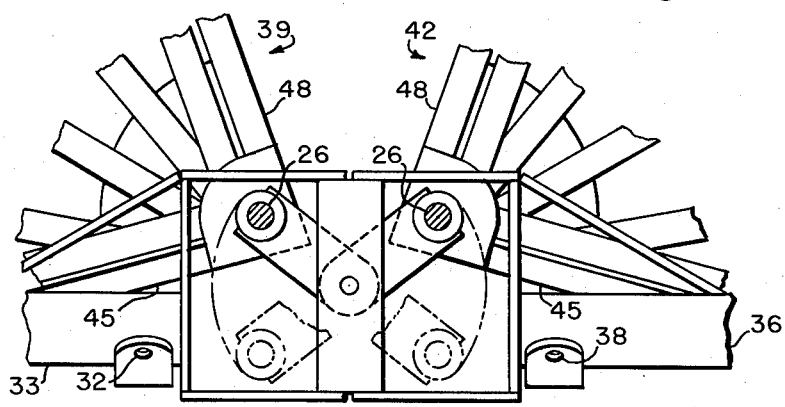
Fig. VII
INVENTOR.
HOWARD E. CRAWFORD
BY
Marshall, Marshall & Yeasting
ATTORNEYS July 4, 1961  H. E. CRAWFORD  2,990,630
TREE MOVING MACHINE
Filed Feb. 18, 1959  7 Sheets-Sheet 7
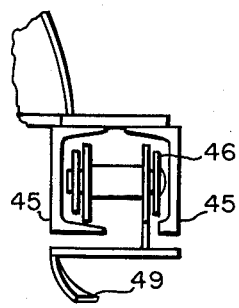
Fig. IX
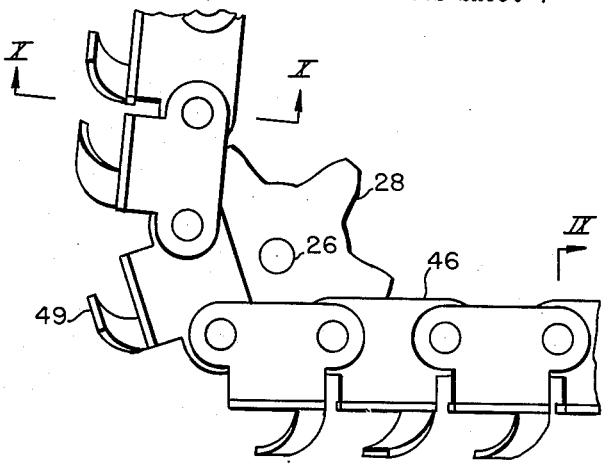
Fig. VIII
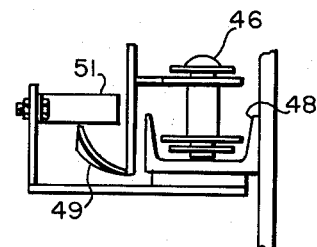
Fig. X
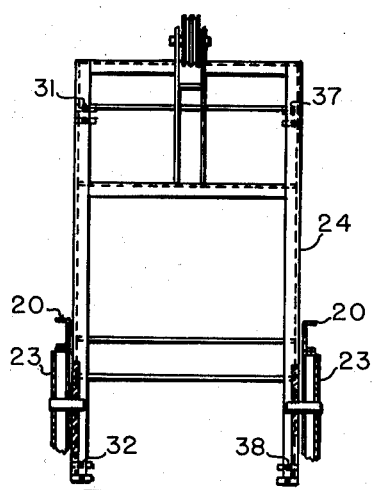
Fig. XII
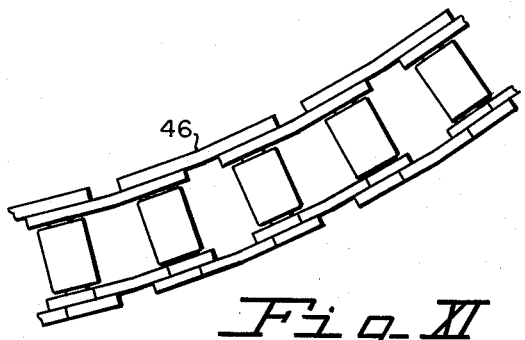
Fig. XI
INVENTOR.
HOWARD E. CRAWFORD
BY
Marshall, Marshall & Yeasting
ATTORNEYS

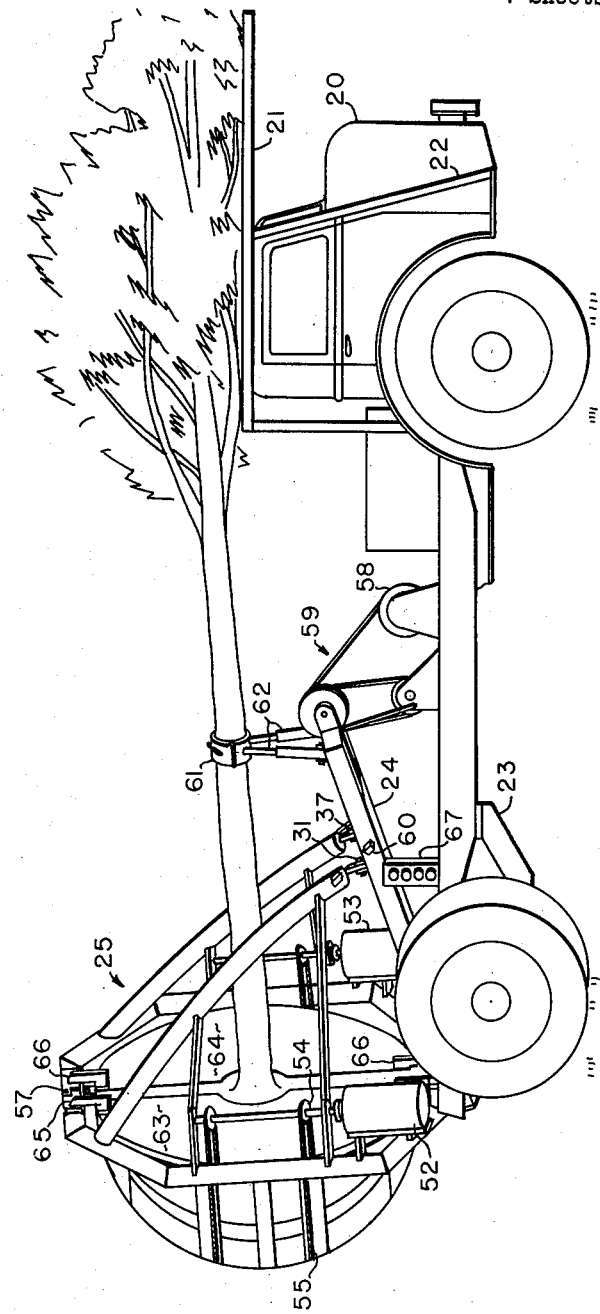

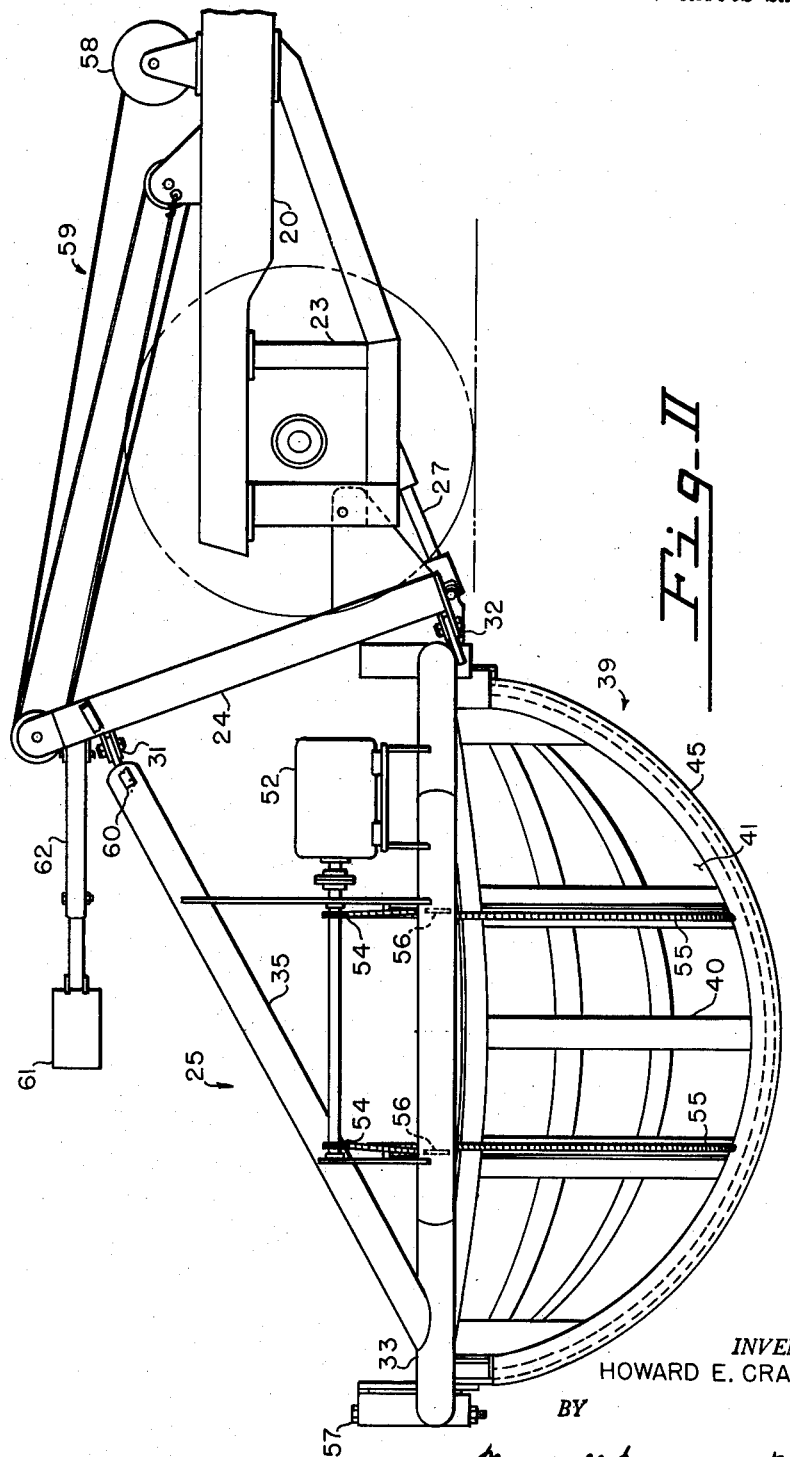

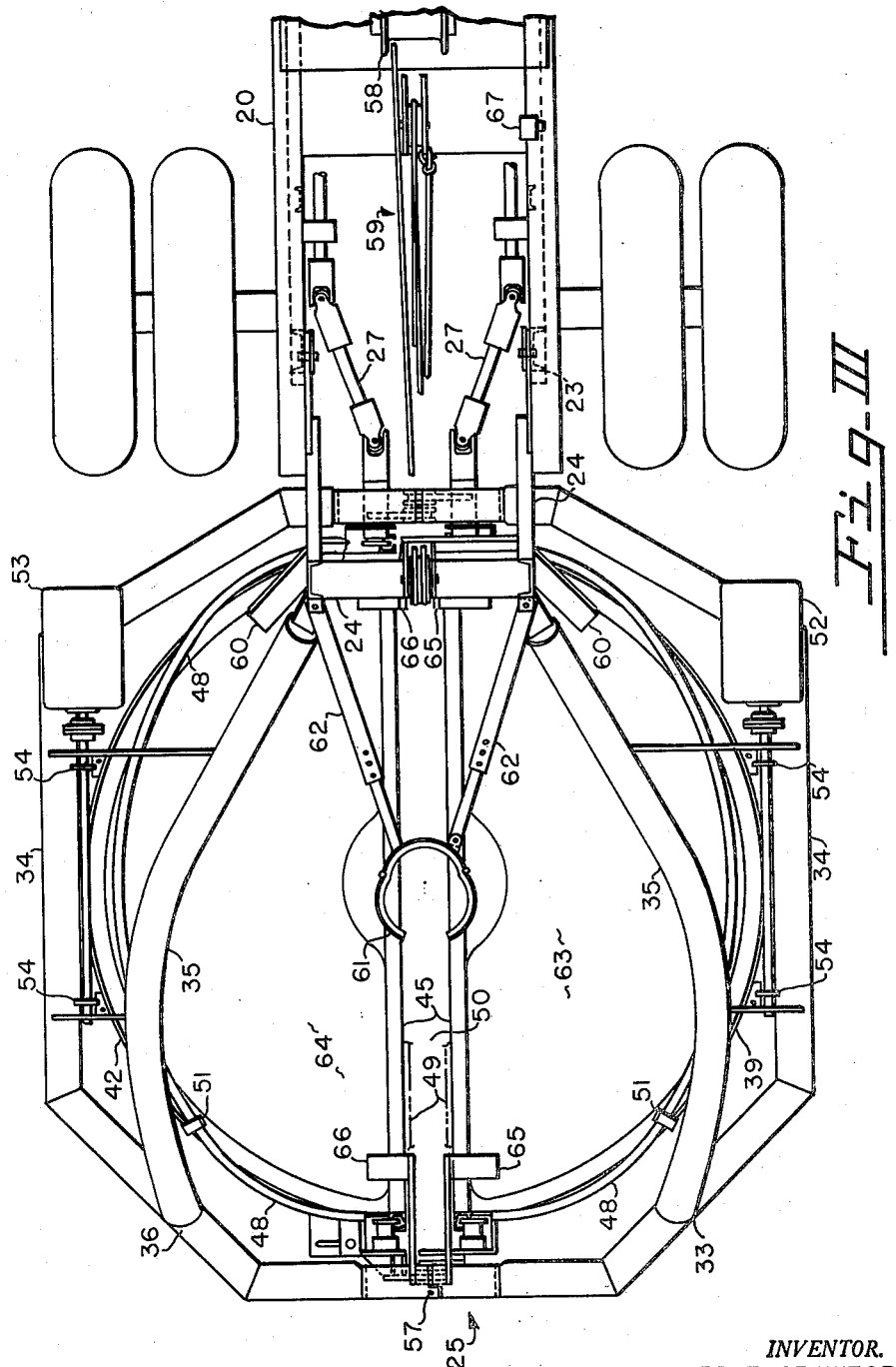

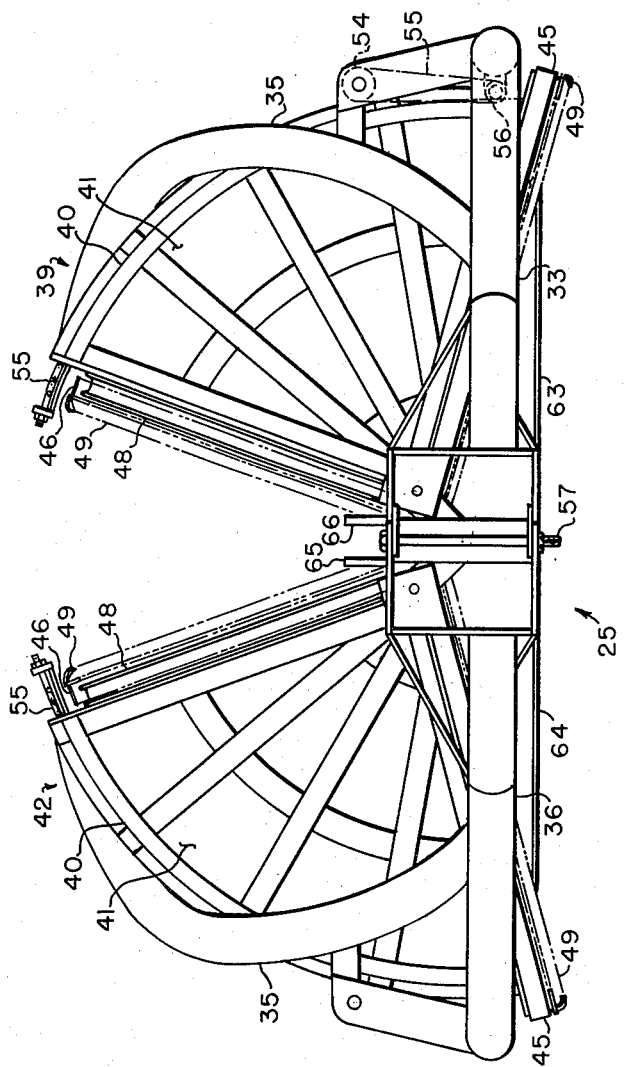

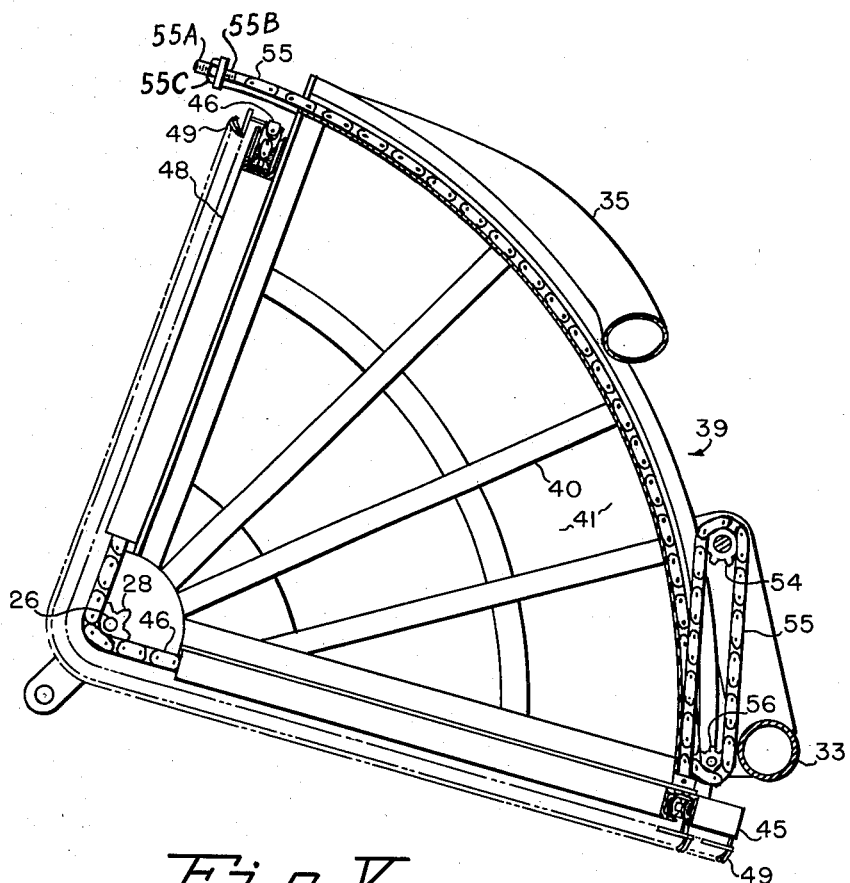

United States Patent Office 2,990,630
Patented July 4, 1961

2,990,630
TREE MOVING MACHINE
Howard E. Crawford, 24964 N. Sylbert Drive,
Detroit, Mich.
Filed Feb. 18, 1959, Ser. No. 794,106
11 Claims. (Cl. 37—2)

It is an object of this invention to provide a machine which is capable of digging a hole adapted to receive a ball of earth containing the roots of a tree, carrying the material dug from such hole to a place where it is desired that such material be deposited, digging out a ball of earth containing the roots of a tree to be moved, transporting such ball of earth with such tree and its roots to the hole previously dug, and transplanting the tree by placing the ball of earth in the previously dug hole.

Another object is to provide a machine of the type outlined above which is capable of digging a hemispherical hole and making a hemispherical ball of earth containing roots of a tree the trunk of which extends substantially perpendicularly from the flat side of the hemispherical ball of earth, whereby the ball of earth may be set into the hole from any side.

Another object is to provide a machine of the type outlined above equipped with a pair of substantially quarter-spherical shells which can be swung apart to straddle a standing tree trunk and swung together to constitute a substantially hemispherical bucket structure having a circular edge lying upon the ground surrounding said standing tree trunk.

Another object is to provide a machine of the type hereinabove outlined in which the edges of the quarter-spherical shells engaging the ground are equipped with cutters that are moved along such edges to sever outer portions of long roots and dig out a hemispherical ball of earth containing short roots and inner portions of long roots, the machine being equipped also with means to swing the quarter-spherical shells downwardly and inwardly through paths cleared by said cutters until the leading edges of said shells approach each other so that the shells constitute a substantially hemispherical bucket containing said such hemispherical ball of earth.

It is a further object to provide a machine of the type outlined above with means for lifting the bucket constituted by the quarter-spherical shells, the hemispherical ball of earth within the bucket, and also the tree extending from the ball of earth, and tilting the bucket, ball of earth and tree so that the top of the tree is lowered to avoid striking overhead obstacles while being transported.

Another object is to provide means for preventing the earth of the ball from spilling from the bucket when the bucket is tilted into position for transportation.

And still another object is to so design the machine that certain movements of the mechanism are assisted by gravity.

Other objects and numerous advantages of the invention will become apparent upon perusal of the following description illustrated by the accompanying drawings, in which:

FIG. I is a side view of the machine embodying the invention with a tree shown in position to be transported by the machine;

FIG. II is a side view of a portion of the mechanism of the machine with the parts in the positions assumed by them preparatory to lifting a ball of earth and a tree, which are not shown, certain elements being removed to better display the construction;

FIG. III is a plan view of the portion of the tree moving machine that is illustrated in FIG. II;

FIG. IV is a rear elevational view of skeletons of quarter-spherical shells and of shell supporting framework, the shell skeletons being shown in the positions assumed by them just after the digging process has started;

FIG. V is an enlarged fragmentary elevational view of a portion of a shell skeleton and mechanism for moving said shell into the earth as digging progresses;

FIG. VI is a fragmentary plan view showing parts of shafts, sprockets and cutters employed in the digging mechanism of the machine;

FIG. VII is an enlarged fragmentary view showing the relationship of axes about which the shells are swung;

FIG. VIII is an enlarged view showing details of a cutter chain, cutters carried thereby and a sprocket over which the cutter chain is moved;

FIG. IX is a sectional view of a leading edge track with a section of cutter chain therein seen as indicated by the lines IX—IX of FIG. VIII;

FIG. X is a sectional view of a segment of return track with a section of cutter chain therein as seen from the position indicated by the line X—X of FIG. VIII;

FIG. XI is a view of a piece of the cutter chain per se; and

FIG. XII is a rear elevational view of a gin structure employed in raising and tilting a tree to be transported.

The following description and the accompanying drawings describe and illustrate a preferred form of the instant invention but they are not intended to impose limitations upon the scope of the invention.

The tree moving machine of this invention includes a vehicle which may be a truck having a chassis of conventional form but which preferably is a truck 20 having a chassis so constructed that the cab is at a reduced height that permits a tree trunk to be lowered to more nearly a horizontal position. A rack 21 extends forwardly from the top of the cab and is supported by struts 22 to hold up the branches of the tree so that they will not obstruct the drivers forward vision.

Pivotally mounted on a chassis bracket 23 at the rear of the truck 20 is a rectangular gin structure which supports a bucket frame 25. Pivoted to the right side of the gin structure 24, by means of an upper hinge member 31 and a lower hinge member 32, is the right half 33 of the bucket frame 25, preferably consisting of heavy tubing, straight pieces of such tubing being welded end to end and into a multi-lateral arc 34 which is supported by a somewhat curved diagonal stay 35. The left half 36 of the bucket frame 25 is similar to the right half 33 and is similarly hinged to the left side of the gin structure 24 by means of an upper hinge member 37 and a lower hinge member 38.

The right half 33 of the bucket frame supports a substantially quarter-spherical shell 39, which may be formed integrally of resin bound fiber glass or steel, but which as illustrated consists of a skeleton 40 constructed of curved steel strips welded together. The skeleton 40 is provided with a liner 41 of heavy sheet metal which can either be formed in a large press or made up of small plates that are welded to the strips of the skeleton 40. The left half 36 of the bucket frame supports a nearly quarter-spherical shell 42 which is a mirror duplicate of the quarter-spherical shell 39.

The shells 39 and 42 are pivoted respectively to the halves 33 and 36 of the bucket frame on axes 43 and 44 which are separate as indicated in FIG. VI but which coincide when the halves of the bucket frame are in the positions in which they are shown in FIGS. III, IV and VII. When the shells are swung downwardly their leading edges do not quite meet and the hemispherical bucket which they constitute while in the position in which they are shown in FIGS. II and III has a narrow gap 50 along its underside.

The lowermost edge of each shell carries a lower arcuate channel 45 forming a chainway, the channel being open toward the direction in which the edge moves as the shells are swung downwardly. Lying within the lower arcuate channel 45 is a length of chain 46, the links of the chain 46 lying in the position in which they are shown in FIG. IX. The chain 46 is drawn along the channel 45 by means of a sprocket 28 which is turned by a jointed rod 27 from the vehicle transmission. When it leaves the sprocket 28 the chain moves into an arcuate return channel 48 which lies along the uppermost edge of the shell 39. In the return channel 48 the chain lies in the position in which it is shown in FIG. X.

The chain 46 carries a series of cutting blades 49 which, as the chain moves through the channel 45 along the lowermost edge of the nearly quarter-spherical shell 39, chop off the outer portions of long roots and cut a kerf in the soil through which the quarter-spherical shell can move downwardly. As many as desired of the chain links may have blades fixed thereto. To improve the manner in which the chain 46 passes through the channels and from one channel to the other over the sprocket 28, the chain may be slightly curved laterally in the manner indicated in FIG. XI.

The blades 49 at the completion of the digging process operate in the narrow gap, which is numbered 50 in FIG. III, without interfering with each other. Cleaner fingers 51, which are fixedly secured to the return channels 48 along the uppermost edges of the shells, serve to loosen and remove such rootlets and other debris as may be carried along with the blades.

The sprockets 28 are fixed to short shafts 26 which are journaled in bearings that are mounted on the shells 39 and 42. The short shafts 26 are at the rear terminals of jointed rods 27 leading from power take-off mechanism in the trucks transmission. Since truck transmissions with power take-off mechanisms are commercially available and per se are not of this applicant's invention, the transmission with the power take-off mechanism is not described in this specification or shown in the accompanying drawings. The jointed rods 27 turn in opposite directions thereby turning in opposite directions the sprockets 28 (see FIG. VIII).

The shells 39 and 42 are swung downwardly to dig out a ball of earth and upwardly to release the ball of earth after it has been reset in a previously dug hole by means of separate motors which, with speed reducing mechanism, are housed in casings 52 and 53. Since such motors assembled with speed reducing gearing are commercially available and are not per se of this applicant's invention only their casings 52 and 53, which are rigidly mounted respectively on right and left halves 33 and 36 of the bucket frame 25, are shown in the accompanying drawings. The motors are reversible and act through the speed reducing gearing that turn sprockets 54 slowly. When a sprocket 54 is turning counterclockwise it pulls the shell swinging chain 55 around an idler sprocket 56, thereby swinging the shell 39 slowly downwardly. The upper end of the chain 55 is attached by means of an adjusting bolt 55A, which passes through an ear on a bracket 55B and is held in place by means of a nut 55C. The tension of the chain 55 can be adjusted by turning the nut 55C. When the motor is reversed and the sprocket 54 turns clockwise the shell swinging chain 55 pulls the lowermost edge of the shell 39 upwardly thereby swinging the shell upwardly. The motor and gearing mounted in the casing 53 act concurrently with the motor and gearing mounted in the housing 52 so that the shells swing toward and away from each other concurrently somewhat after the fashion of the two parts of a cam shell dredge bucket. The motor can be controlled by switches 67 that are installed wherever convenient.

With the mechanism in the position in which it is shown in FIG. II, the axes of the hinge members 31 and 32 on which the two halves of the bucket frame are pivoted slope upwardly and rearwardly, and the gravitational forces acting on the two halves of the bucket frame and parts carried thereby tend to swing the two halves toward each other. This is so whether the two buckets are in the position shown in FIG. II or are in the position shown in FIG. IV. After they have swung together they may be held against swinging apart by means of a locking pin 57 inserted through openings in plates fixed to each half of the bucket frame. It is intended that this pin should be inserted whenever the gin structure 24 is to be tilted forwardly by means of a winch 58 and compound pulley system 59 and also whenever the bucket constituted by the shells 39 and 42 is to be closed in digging out a ball of earth or opened in transplanting a tree.

When, however, the machine is to be moved into position relative to a tree that is to be dug out the gin structure can be tilted into a position in which it leans slightly forward. Thereupon the locking pin 57 may be removed and the rear ends of the bucket frame will swing apart until they engage stops 60, so that they can straddle the trunk of the tree. After the vehicle 20 is backed toward the tree, the two halves of the bucket frame may be caused to swing toward each other by loosening the winch and thus permitting the gin structure to lean back into the position in which it is shown in FIG. II, or they can be manually brought together, and the pin 57 reinserted. While the machine is thus being positioned, it can be maneuvered slightly to cause the tree trunk to stand freely in the gap through the inverted hemispherical bucket. A clamping collar 61 carried by adjustable arms 62 extending rearwardly from the gin structure 24 may be engaged with the tree trunk and tied or otherwise fastened in place thereon to more securely prevent the tree from tipping out of place while it is being lifted and transported and replanted.

Plates 63 and 64 which are semi-circular in shape and which are fastened respectively to the two halves 33 and 36 of the bucket frame by means of heavy brackets 65 and 66 are located in position to overlie the contents of the bucket when it is filled and thus prevent any of the contents from spilling out when the bucket is tipped to the position in which it is shown in FIG. I. The plates 63 and 64 perform the additional function of preventing any of the contents of the bucket from clinging to the sides of the shells as they are swung upwardly to release the ball of earth when a tree is being replanted. The plates 63 and 64 swing laterally away from and toward each other with the two halves 33 and 36 of the bucket frame when the bucket frame is opened to straddle a tree trunk.

To move a tree, the tree moving machine can be employed first to dig a hemispherical hole at the site into which the tree is to be moved. The dirt from the hole so dug can then be carried in the bucket and dumped elsewhere, e.g. adjacent to the tree where it subsequently can be used to fill the hole left by removal of a ball of the earth in which the tree is rooted. With the two halves of the bucket frame opened to straddle the trunk of the tree the vehicle can be backed toward the tree from any chosen direction and maneuvered until the trunk of the tree is properly straddled, whereupon the bucket frame can be closed and locked and the clamping collar applied to the trunk. After the tree has been lifted and tipped onto the vehicle it can be transported to the site to which it is to be moved where the vehicle can be made to approach the previously dug hemispherical hole from any chosen direction and the tree can be lowered and righted to transplant it with optimum orientation and erectness.

The embodiments of the invention hereinabove described and illustrated in the accompanying drawings is exemplary only and it is to be understood that the invention is susceptible to modification within the spirit and scope of the subjoined claims.

I claim:

1. In a tree moving machine, in combination, a pair of nearly quarter-spherical shells, means for hingedly supporting said shells on nearly coincident hinge axes, said shells thus being so separable as to enable them to move away from and toward each other from straddling into encompassing relation with a standing trunk of a tree, said shells when in such encompassing relation constituting an inverted substantially hemispherical bucket with a nearly circular rim overlying the earth around such standing trunk, said inverted substantially hemispherical bucket having an upwardly opening gap through which such standing trunk may extend, said shells each having a nearly semi-circular edge which constitutes a part of the nearly circular rim of the inverted substantially hemispherical bucket, said shells being so articulated on axes substantially perpendicular to said hinge axes that their nearly semi-circular edges generate approximately quarter-spherical paths when said shells swing about their axes of articulation, and kerf cutting means carried with said edges of said shells to cut approximately quarter-spherical kerfs through earth and roots beneath such tree, into which kerf said shells may move and thus transform said inverted substantially hemispherical bucket encompassing such tree into a noninverted substantially hemispherical bucket containing an approximately hemispherical ball of earth in which such tree is rooted.

2. In a tree moving machine, in combination, a pair of nearly quarter-spherical shells, means for hingedly supporting said shells on nearly coincident hinge axes, said shells thus being so separable as to enable them to move away from and toward each other from straddling into encompassing relation with a standing trunk of a tree, said shells when in such encompassing relation constituting an inverted substantially hemispherical bucket with a nearly circular rim overlying the earth around such standing trunk, said inverted substantially hemispherical bucket having an upwardly opening gap through which such standing trunk may extend, said shells each having a nearly semi-circular edge which constitutes a part of the nearly circular rim of the inverted substantially hemispherical bucket, said shells being so articulated on axes substantially perpendicular to said hinge axes that their nearly semi-circular edges generate approximately quarter-spherical paths when said shells swing about their axes of articulation, and kerf cutting means carried with said edges of said shells to cut approximately quarter-spherical kerfs through earth and roots beneath such tree, into which kerf said shells may move and thus transform said inverted substantially hemispherical bucket encompassing such tree trunk into a noninverted substantially hemispherical bucket containing an approximately hemispherical ball of earth in which such tree is rooted, a vehicle, a gin structure pivotally mounted upon said vehicle, said bucket being carried by said gin structure, and means for tipping said gin structure fore and aft to raise and lower said bucket and its contents whereby a hemispherical hole can be dug by said kerf cutting means, earth can be removed from said spherical hole by said bucket and deposited by swinging said shells upwardly about their axes of articulation.

3. In a tree moving machine, in combination, a pair of nearly quarter-spherical shells, means for hingedly supporting said shells on nearly coincident hinge axes, said shells thus being so separable as to enable them to move away from and toward each other from straddling into encompassing relation with a standing trunk of a tree, said shells when in such encompassing relation constituting an inverted substantially hemispherical bucket with a nearly circular rim overlying the earth around such standing trunk, said inverted substantially hemispherical bucket having an upwardly opening gap through such standing trunk may extend, said shells each having a nearly semi-circular edge which constitutes a part of the nearly circular rim of the inverted substantially hemispherical bucket, said shells being so articulated on axes substantially perpendicular to said hinge axes that their nearly semi-circular edges generate approximately quarter-spherical paths when said shells swing about their axes of articulation, and kerf cutting means carried with said edges of said shells to cut approximately quarter-spherical kerfs through earth and roots beneath such tree, into which kerf said shells may move and thus transform said inverted substantially hemispherical bucket encompassing such tree trunk into a noninverted substantially hemispherical bucket containing an approximately hemispherical ball of earth in which such tree is rooted, a vehicle having power take off means to operate said kerf cutting means, and means carried by said vehicle to raise and lower said bucket and its contents, whereby such ball of earth can be raised, transported and lowered for transplantation of such tree.

4. In a tree moving machine, in combination, a pair of nearly quarter-spherical shells, means for hingedly supporting said shells on nearly coincident hinge axes, said shells thus being so separable as to enable them to move away from and toward each other from straddling into encompassing relation with a standing trunk of a tree, said shells when in such encompassing relation constituting an inverted substantially hemispherical bucket with a nearly circular rim overlying the earth around such standing trunk, said inverted substantially hemispherical bucket having an upwardly opening gap through which such standing trunk may extend, said shells each having a nearly semi-circular edge which constitutes a part of the nearly circular rim of the inverted substantially hemispherical bucket, said shells being so articulated on axes substantially perpendicular to said hinge axes that their nearly semi-circular edges generate approximately quarter-spherical paths when said shells swing about their axes of articulation, and kerf cutting means carried with said edges of said shells to cut approximately quarter-spherical kerfs through earth and roots beneath such tree, into which kerf said shells may move and thus transform said inverted substantially hemispherical bucket encompassing such tree trunk into a noninverted substantially hemispherical bucket containing an approximately hemispherical ball of earth in which such tree is rooted, a vehicle having a cab capable of supporting a part of such tree, a gin structure pivotally mounted upon said vehicle said bucket being carried by said gin structure, means for tipping said gin structure to raise and lower said bucket and tilt said bucket fore and aft, whereby such tree can be positioned to extend over said cab.

5. In a tree moving machine, in combination, a pair of nearly quarter-spherical shells, means for hingedly supporting said shells on nearly coincident hinge axes, said shells thus being so separable as to enable them to move away from and toward each other from straddling into encompassing relation with a standing trunk of a tree, said shells when in such encompassing relation constituting an inverted substantially hemispherical bucket with a nearly circular rim overlying the earth around such standing trunk, said inverted substantially hemispherical bucket having an upwardly opening gap through which such standing trunk may extend, said shells each having a nearly semi-circular edge which constitutes a part of the nearly circular rim of the inverted substantially hemispherical bucket, said shells being so articulated on axes substantially perpendicular to said hinge axes that their nearly semi-circular edges generate approximately quarter-spherical paths when said shells swing about their axes of articulation, and kerf cutting means carried with said edges of said shells to cut approximately quarter-spherical kerfs through earth and roots beneath such tree, into which kerf said shells may move and thus transform said inverted substantially hemispherical bucket encompassing such tree trunk into a noninverted substantially hemispherical bucket containing an approximately hemispherical ball of earth in which such tree is rooted, a vehicle having a cab capable of supporting a part of such tree, a gin structure pivotally mounted upon said vehicle said bucket being carried by said gin structure, means for tipping said gin structure to raise and lower said bucket and tilt said bucket fore and aft, whereby such tree can be positioned to extend over said cab, and means to prevent branches of said tree from hanging in front of said cab.

6. The combination defined in claim 1 in which said kerf cutting means includes a chain, a chain-way along a semi-circular edge of said shells, a chain movable along each of said chain-ways and a series of blades carried by said chain.

7. The combination defined in claim 3 in which said kerf cutting means includes a chain, a chain-way along a semi-circular edge of each of said shells, a chain movable along each of said chain-ways and a series of blades carried by said chain.

8. In a tree moving machine, in combination, a vehicle, a gin structure pivoted upon said vehicle, a bucket frame carried by said gin structure, said bucket frame consisting of two halves each half being hinged to said gin structure upon a separate axis to enable said halves to move away from and toward each other from straddling into encompassing relation with a standing trunk of a tree, a pair of nearly quarter-spherical shells, each of said shells being articulated with one of said halves, means for tipping fore or aft the axis upon which said bucket frame is hinged to said gin structure and thereby causing gravity to tend to separate said halves and the shells articulated respectively therewith or alternatively causing gravity to tend to move said halves and shells toward each other.

9. The combination defined in claim 3 in which said kerf cutting means includes a chain, a chain-way along an edge of each of said shells, a chain movable along each of said chain-ways and a series of blades carried by said chain, releasable locking means for preventing said halves from separating and means for limiting the extent of such separation when said locking means is released.

10. In a tree moving machine, in combination, a pair of nearly quarter-spherical shells, said shells being so separable as to enable them to move away from and toward each other from straddling into encompassing relation with a standing trunk of a tree, said shells when in such encompassing relation constituting an inverted substantially hemispherical bucket with a nearly circular rim overlying the earth around such standing trunk, said inverted substantially hemispherical bucket having an upwardly opening gap through which such standing trunk may extend, said shells each having a nearly semi-circular edge which constitutes a part of the nearly circular rim of the inverted substantially hemispherical bucket, said shells being so articulated that their nearly semi-circular edges generate approximately quarter-spherical paths when said shells swing about their axes of articulation, and nearly semicircular kerf cutting means carried with said edges of said shells to cut approximately quarter-spherical kerfs through earth and roots beneath such tree, into which kerf said shells may move and thus transform said inverted substantially hemispherical bucket encompassing such tree trunk into a noninverted substantially hemispherical bucket containing an approximately hemispherical ball of earth in which such tree is rooted and reversible power operated means for moving said shells about their axes of articulation in either direction and thereby constituting either a noninverted bucket to retain such ball of earth or an inverted bucket to release such ball of earth.

11. In a tree moving machine, in combination, a pair of nearly quarter-spherical shells, means for hingedly supporting said shells on nearly coincident hinge axes, said shells thus being so separable as to enable them to move away from and toward each other from straddling into encompassing relation with a standing trunk of a tree, said shells when in such encompassing relation constituting an inverted substantially hemispherical bucket with a nearly circular rim overlying the earth around such standing trunk, said inverted substantially hemispherical bucket having an upwardly opening gap through which such standing trunk may extend, said shells each having a nearly semi-circular edge which constitutes a part of the nearly circular rim of the inverted substantially hemispherical bucket, said shells being so articulated on axes substantially perpendicular to said hinge axes that their nearly semi-circular edges generate approximately quarter-spherical paths when said shells swing about their axes of articulation, and kerf cutting means carried with said edges of said shells to cut approximately quarter-spherical kerfs through earth and roots beneath such tree, into which kerf said shells may move and thus transform said inverted substantially hemispherical bucket encompassing such tree trunk into a noninverted substantially hemispherical bucket containing an approximately hemispherical ball of earth in which such tree is rooted, a vehicle having a cab, a gin structure pivotally mounted upon said vehicle said bucket being carried by said gin structure, means for tipping said gin structure to raise and lower said bucket and tilt said bucket fore and aft, whereby such tree can be positioned to extend over said cab, and plates overlying said hemispherical ball of earth to prevent spilling thereof when said bucket is tilted and to prevent earth from sticking to said shells when said noninverted bucket is retransformed into an inverted bucket.

References Cited in the file of this patent

UNITED STATES PATENTS

| | | |
|---|---|---|
| 594,668 | Wilkens | Nov. 30, 1897 |
| 1,509,994 | Carroll | Sept. 30, 1924 |
| 2,410,203 | Culley | Oct. 29, 1946 |
| 2,755,570 | Blackburn et al. | July 24, 1956 |
| 2,769,278 | Wassell et al. | Nov. 6, 1956 |

UNITED STATES PATENT OFFICE

CERTIFICATE OF CORRECTION

Patent No. 2,990,630                                                        July 4, 1961

Howard E. Crawford

It is hereby certified that error appears in the above numbered patent requiring correction and that the said Letters Patent should read as corrected below.

Column 5, line 19, after "tree" insert -- trunk --; column 7, line 6, after "of" insert -- each of --.

Signed and sealed this 30th day of January 1962.

(SEAL)
Attest:

ERNEST W. SWIDER                                      DAVID L. LADD
Attesting Officer                                          Commissioner of Patents